United States Patent
Krenz et al.

(10) Patent No.: US 11,228,987 B2
(45) Date of Patent: Jan. 18, 2022

(54) METHOD AND WIRELESS COMMUNICATION DEVICE FOR SHARING A TOTAL POWER BUDGET BETWEEN AT LEAST TWO TRANSMITTERS

(71) Applicant: Motorola Mobility LLC, Chicago, IL (US)

(72) Inventors: Eric Krenz, Crystal Lake, IL (US); Mohammed Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 127 days.

(21) Appl. No.: 16/844,943

(22) Filed: Apr. 9, 2020

(65) Prior Publication Data
US 2021/0321340 A1 Oct. 14, 2021

(51) Int. Cl.
*H04W 52/34* (2009.01)
*H04W 72/04* (2009.01)
*H04W 52/28* (2009.01)
*H04B 1/02* (2006.01)
(Continued)

(52) U.S. Cl.
CPC .......... *H04W 52/34* (2013.01); *H04B 1/02* (2013.01); *H04W 52/146* (2013.01); *H04W 52/281* (2013.01); *H04W 72/0473* (2013.01); *H04W 88/06* (2013.01)

(58) Field of Classification Search
CPC .......... H04W 52/34; H04W 72/0473; H04W 52/281; H04W 52/146; H04W 88/06; H04B 1/02
See application file for complete search history.

(56) References Cited

U.S. PATENT DOCUMENTS

2009/0221241 A1* 9/2009 Ghosh .................. H04B 7/0617
455/69
2012/0120998 A1* 5/2012 Fakhrai ................ H04B 7/0689
375/224

OTHER PUBLICATIONS

Federal Communications Commission Office of Engineering and Technology Laboratory Division, "RF Exposure Procedures and Equipment Authorization Policies for Mobile and Portable Devices", 447498 D01 General RF Exposure Guidance v06, 34 pages, Oct. 23, 2015.

(Continued)

*Primary Examiner* — Brenda H Pham
(74) *Attorney, Agent, or Firm* — Loppnow & Chapa

(57) ABSTRACT

The present application provides a method and a wireless communication device, which includes selecting a total transmitter power target. A target transmitter power is identified for each of the transmitters operating separately at which each individual transmitter would meet a transmitted radio frequency signal exposure limit relative to a user of the wireless communication device. A fixed ratio is determined for each of the transmitters to be used with the total transmitter power target, based on the determined fixed ratio of the target transmitter power identified for each of the transmitters to the total transmitter power target. Power is dynamically shared between the transmitters in response to varying uplink power requests received from a network, where a power level being used for each of the transmitters is equal to the determined fixed ratio multiplied by a corresponding one of a shared power value, where the sum of the shared power values equals the total transmitter power target for each of the transmitters.

20 Claims, 4 Drawing Sheets

(51) Int. Cl.
*H04W 52/14* (2009.01)
*H04W 88/06* (2009.01)

(56) References Cited

OTHER PUBLICATIONS

International Electrotechnical Commission, International Standard, IEC 62209-2, Edition 1.0, Mar. 2010, 113 pages.
3GPP TS 38.101-3 V16.2.1 (Dec. 2019), 3rd Generation Partnership Project; Technical Specification Group Radio Access Network; NR; User Equipment (UE) radio transmission and reception; Part 3: Range 1 and Range 2 Interworking operation with other radios (Release 16), 340 pages.
3GPP TS 38.213 V16.1.0 (Mar. 2020), 3rd Generation Partnership Project; Technical Specification Group Radio Access Network; NR; Physical layer procedures for control (Release 16), 156 pages.

* cited by examiner

METHOD AND WIRELESS COMMUNICATION DEVICE FOR SHARING A TOTAL POWER BUDGET BETWEEN AT LEAST TWO TRANSMITTERS

FIELD OF THE APPLICATION

The present disclosure relates generally to sharing a total power budget between at least two transmitters in a wireless communication device, and more particularly, managing the radio frequency exposure to a user via dynamic power sharing.

BACKGROUND

Presently, user equipment, such as wireless communication devices, communicate with other communication devices using wireless signals, such as within a network environment that can include one or more cells within which various communication connections with one or more networks and other devices operating within the network(s) can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

Wireless communication devices by their very nature emit energy that can be detected outside of the device. Sometimes the emission of energy is purposeful and planned, and produces a desired result. In the same and/or other instances, the energy emitted may include spurious components and/or may have the potential to produce unintended interactions. A desired signal for some may be noise to others, and a balance needs to be struck between the anticipated benefits of sending out a wireless signal, while attempting to mitigate and/or avoid the potential for ill effects that could result. Correspondingly, at least some government regulators have stepped in to help define reasonable standards of operation, recognizing that there are tradeoffs in most situations that need to be appropriately balanced. Furthermore, when a device emits energy into the overall environment, an external regulating body can sometimes help to better take into account the concerns of the public.

In order to support greater data throughput, service providers have been increasingly looking at techniques which extend the available bandwidth that is allowed to be used by a particular user within the system. At least a couple of bandwidth extending techniques include the use of carrier aggregation, dual carrier, and/or dual connectivity, where multiple frequency bands from one or more networks are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of a build out of a network that incorporates the initial adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

In at least some instances, the network infrastructure supporting each of the standards may be alternatively referred to as a cell group. In some of these instances, one cell group may be prioritized over the other cell group. In such an instance, the prioritized cell group may be referred to as a master cell group and a non-prioritized cell group may be referred to as a secondary cell group.

In instances, where there are multiple connections, where in some instance the each of the multiple connections may involve a connection with a different network infrastructure, managing the overall operation of the communication connections in a particular user equipment relative to the potentially multiple networks can present a challenge, as some of the decisions may need to made in an environment where each of the actors may have less than complete information. Still further, it may be necessary to determine how some regulatory limits may be met in an environment involving multiple connections via multiple transmitters that could potentially involve simultaneous and/or overlapping transmissions with multiple different networks, such as an ability to better manage a user's exposure to radio frequency energy.

In connection with managing a total power budget between multiple transmitters, the present inventors have recognized that some networks can have a different exposure impact for the same or similar level of transmitted power. The present inventors have further recognized, that it may be beneficial to take into account the varying exposure impact, when determining how much power to allocate to each of the multiple transmitters.

SUMMARY

The present application provides a method in a wireless communication device for sharing a total power budget between at least two transmitters included as part of the wireless communication device. The method includes selecting a total transmitter power target. A target transmitter power is identified for each of the transmitters operating separately at which each individual transmitter would meet a transmitted radio frequency signal exposure limit relative to a user of the wireless communication device. A fixed ratio is determined for each of the transmitters to be used with the total transmitter power target, based on the determined fixed ratio of the target transmitter power identified for each of the transmitters to the total transmitter power target. Power is dynamically shared between the transmitters in response to varying uplink power requests received from a network, where a power level being used for each of the transmitters is equal to the determined fixed ratio multiplied by a corresponding one of a shared power value, where the sum of the shared power values equals the total transmitter power target for each of the transmitters.

In at least one embodiment, the power level being used for each of the transmitters can be further based on a respective independent fixed cap for each of the transmitters.

The present application further provides a wireless communication device. The wireless communication device includes at least two transmitters, each associated with a radiating element. The wireless communication device further includes a controller coupled to the transmitter. The controller includes a total transmitter power target selection module, and a target transmitter power identification module for identifying a target transmitter power for each of the transmitters operating separately at which each individual transmitter would meet a transmitted radio frequency signal exposure limit relative to a user of the wireless communication device. The controller further includes a fixed ratio determination module that determines a fixed ratio for each of the transmitters to be used with the total transmitter power target, based on the determined fixed ration of the target transmitter power identified for each of the transmitters to the total transmitter power target. The controller still further includes a power sharing module that dynamically shares power between the transmitters in response to varying uplink power requests received from a network, where a power level being used for each of the transmitters is equal to the determined fixed ratio multiplied by a corresponding one of a shared power value, where the sum of the shared power values equals the total transmitter power target for each of the transmitters.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
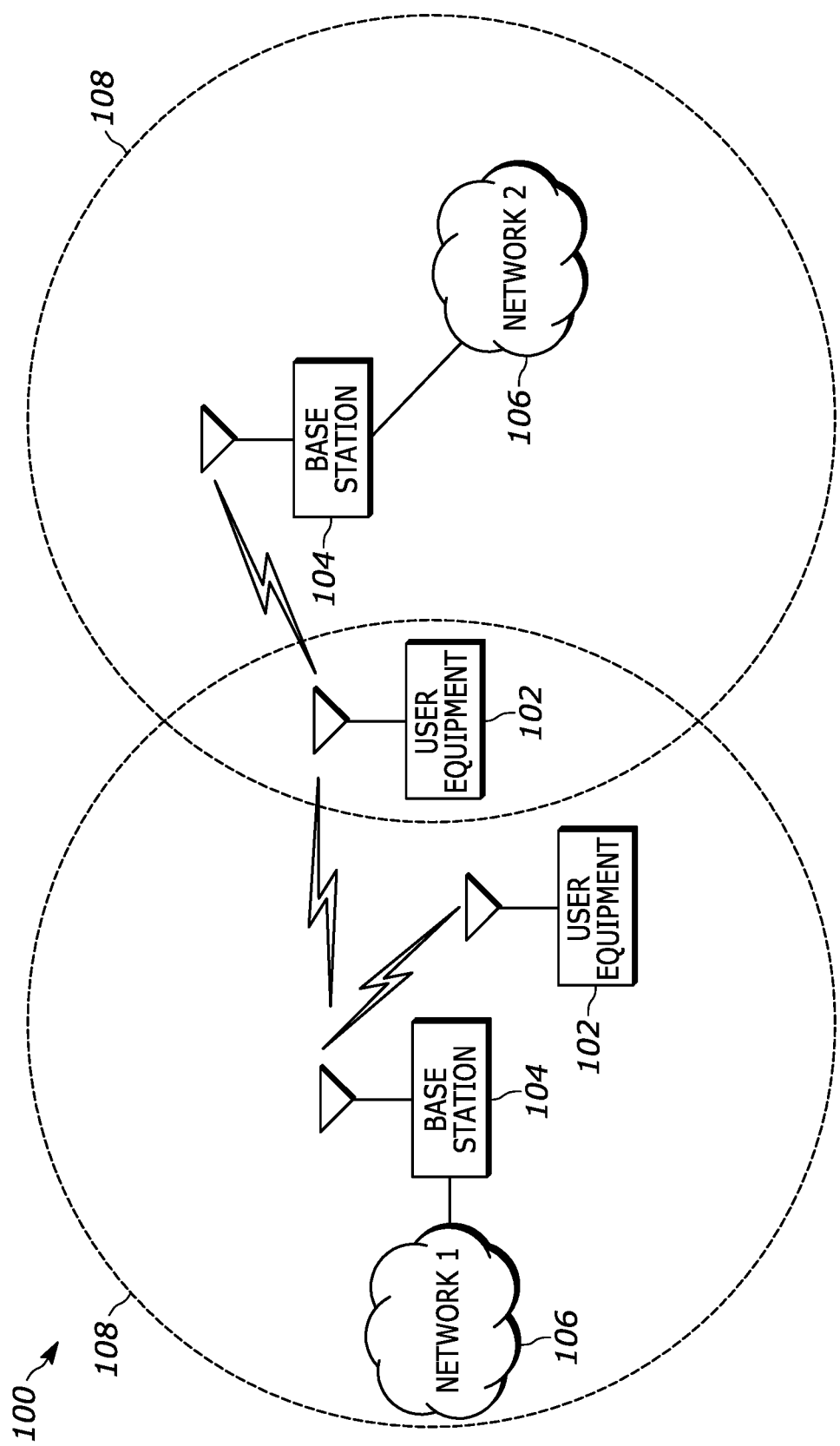
FIG. 1 is a block diagram of an exemplary network environment.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a block diagram of an exemplary network environment 100. The exemplary network environment 100 can include one or more wireless communication devices, such as user equipment 102, which might communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 is generally a wireless communication device that could take the form of a radio frequency cellular telephone. However, the user equipment 102 could also take the form of other types of devices that could support wireless communication capabilities. For example, the different potential types of user equipment can include a tablet, a laptop computer, a desktop computer, a netbook, a cordless telephone, a selective call receiver, a gaming device, a personal digital assistant, as well as any other type of wireless communication device that might be used to support wireless forms of communication.

The various networks 106, base stations 104 and user equipment 102 could be associated with one or more different communication standards. A few examples of different communication standards that a particular network 106 could support include Global System for Mobile Communications (GSM) Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. It is possible that each network and/or associated element could support one or more different communication standards. It is also possible that different networks 106 can support one or more of the same standards.

In addition, the wireless communication devices 102, base stations 104 and networks 106 may utilize a number of additional forms of communication and communication techniques including beamforming, signal diversity, and simultaneous voice and data that concurrently enables the use of simultaneous signal propagation. The wireless communication devices 102, base stations 104 and networks may further utilize carrier aggregation, and/or dual connectivity, which can include the simultaneous use of multiple adjacent carriers, that each can allow for the use of a different wireless communication technology, that is respectively used in conjunction with one or more communication networks.

Figure 2:
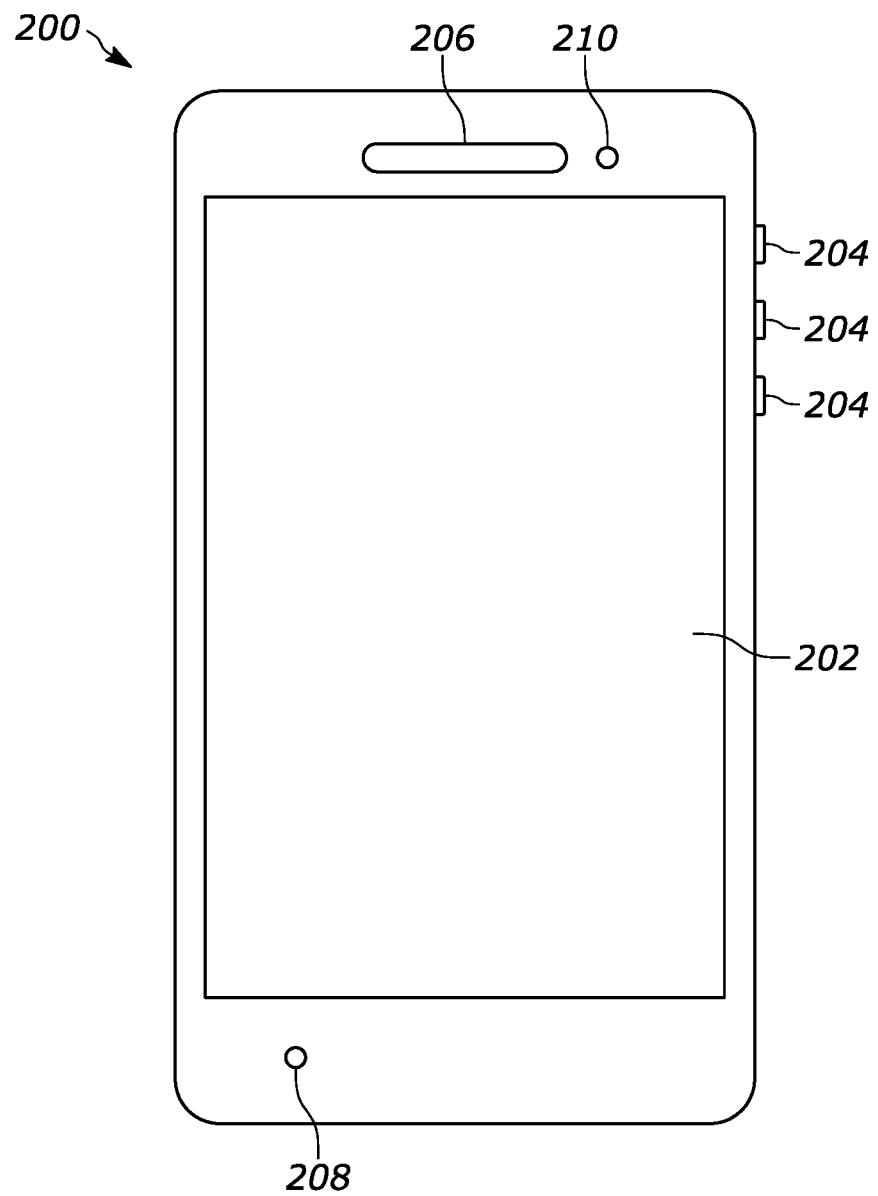
FIG. 2 is a front view of an exemplary user equipment in the form of a wireless communication device, such as a radio frequency radio telephone.

FIG. 2 illustrates a front view 200 of an exemplary user equipment 102 in the form of a wireless communication device, such as a radio frequency radio telephone. In the illustrated embodiment, the radio frequency cellular telephone includes a display 202 which covers a large portion of the front facing. In at least some instances, the display can incorporate a touch sensitive matrix, that can help facilitate the detection of one or more user inputs relative to at least some portions of the display, including an interaction with visual elements being presented to the user via the display 202. In some instances, the visual elements could include an object with which the user can interact. In other instances, the visual elements can form part of a visual representation of a keyboard including one or more virtual keys and/or one or more buttons with which the user can interact and/or select for a simulated actuation. In addition to one or more virtual user actuatable buttons or keys, the device can include one or more physical user actuatable buttons 204. In the particular embodiment illustrated, the device has three such buttons located along the right side of the device.

The exemplary wireless communication device, illustrated in FIG. 2, additionally includes a speaker 206 and a microphone 208 in support of voice communications. The speaker 206 may additionally support the reproduction of an audio signal, which could be a stand-alone signal, such as for use in the playing of music, or can be part of a multimedia presentation, such as for use in the playing of a movie, which might have at least an audio as well as a visual component. The speaker 206 may also include the capability to also produce a vibratory effect. However, in some instances, the purposeful production of vibrational effects may be associated with a separate element, not shown, which is internal to the device. Generally, the speaker 206 is located toward the top of the device, which corresponds to an orientation consistent with the respective portion of the device facing in an upward direction during usage in a portrait orientation in support of a voice communication. In such an instance, the speaker 206 might be intended to align with the ear of the user, and the microphone 208 might be intended to align with the mouth of the user. Also located near the top of the device, in the illustrated embodiment, is a front facing camera 210. The wireless communication device will also generally include one or more radio frequency transceivers, as well as associated transmit and receive circuitry, including one or more antennas that may be positioned internally relative to the device. In some instances, some or all of the antenna elements may also and/or alternatively be incorporated as part of the housing of the device.

The exemplary wireless communication device can further incorporate one or more controllers, which can help manage the overall operation of the device, including managing the overall operation of the wireless communication capabilities, including the sharing of a total power budget between at least two transmitters, which can take into account a fixed ratio for each of the transmitters that takes into account the varying level of exposure impact for the same or similar level of transmitted power. In some instances, a respective fixed cap for each of the transmitters can additionally and/or alternatively be taken into account when determining the respective power level to be used with each of the transmitters. In some instances, the respective fixed ratio and the respective fixed cap can be alternatively prioritized when determining the transmitter power levels based upon the presence within different geographical regions. In some instances, the power levels could be set in a context where a time averaging algorithm may be allowed in managing a user's overall radio frequency energy exposure, as well as an understanding of the spatial relationship of the one or more radiating elements associated with the multiple transmitters.

Portable transceivers are generally required to meet RF exposure regulatory limits, this extends to instances when multiple transmitters are operating simultaneously. This can becomes more of a issue with some operating modes, such as 5th generation (5G) non-standalone (NSA) operation now being deployed, since both an LTE and NR transmitter may desirably be operating during overlapping time windows. Simply reducing power of both transmitters can make the sum of their exposures meet the limit, but at the potential expense of dropped connection or reduced network performance for the user. A fixed power reduction on both transmitters may be unnecessarily conservative in many scenarios, for example when only one is nominally operating at higher power. What may be beneficial is a method or apparatus to manage power of simultaneous transmitters dynamically, to ensure regulatory compliance while enhancing the quality (power) of the uplinks to better optimize the user experience.

Some standards, such as the 3rd generation partnership project (3GPP), currently include a simple dynamic power sharing algorithm (e.g. in technical specification (TS) 38.213 and 38.101-3). However, this by itself generally does not provide a framework for appropriately weighting the power division based on which transmitter may have a larger or smaller radio frequency (RF) exposure contribution at a given power, nor does it mathematically insure compliance, both potential aspects of the present disclosure, in accordance with at least some embodiments.

3GPP also elaborates simple fixed power reductions or power caps for various types of transmission impairment. But again, these do not mathematically account for differing exposure contributions of different transmitters, nor a manner in which compliance with RF exposure limits may be better met.

For evolved universal terrestrial radio access (E-UTRA) new radio (NR) dual connectivity (ENDC) combinations, implementations have generally been limited to taking into account power caps on individual transmitters, where "ratio" aspects, as described herein, are generally not used and/or known. Such an implementation can support radio frequency exposure compliance, but at least sometimes can impair the dynamic power sharing aspect and at least sometimes can lead to greater than necessary power reduction.

Time-averaging of exposure is a method of reducing the impact of power reduction on simultaneous transmission cases, that can additionally be used in accordance with at least some embodiments of the present application. However, this is on a different axis from at least some of the features of the present disclosure, and in fact many aspects of the present disclosure can be applied within a time-averaging algorithm to further improve the algorithm's performance.

In accordance with at least some embodiments, the present disclosure provides an algorithm to better control the power being transmitted by each of multiple transmitters, such that a total power budget is shared between the multiple transmitters, dynamically, in a way that better supports compliance to the radio frequency exposure standard while responding to varying uplink power requests from the network, in compliance with the relevant standard. The features of the present disclosure may also be applicable to other standards, but is specifically discussed, described and elaborated in the context of 5G NSA ENDC operation under the 3GPP standard.

Specifically, in accordance with at least some embodiments power can be dynamically shared between the NR and LTE transmitters, such that at each instant in time, each transmitter's power can be set as a fixed ratio to a corresponding portion of a total power target (sum of transmitters' powers), wherein said fixed ratio is proportional to the power wherein each individual transmitter would just meet an exposure limit applicable to the simultaneous use case, divided by the total power target. Additionally, independent fixed power caps may be applied to further limit each transmitter's maximum output.

1. Compliance Via Dynamic Power Sharing

During simultaneous transmission by two (non-coherent) transmitters, making a worst-case assumption of fully overlapping specific absorption rate (SAR) hotspots, the device will be compliant if at all instants of time the SARs of each transmitter satisfies the condition that total exposure ratio (TER) is less than or equal to one, as follows:

$$\frac{SAR_1}{SAR_L} + \frac{SAR_2}{SAR_L} \leq 1$$

$SAR_1$ and $SAR_2$ are the instantaneous SAR values of transmitters 1 and 2, respectively, where by "instantaneous SAR", we mean the SAR that would result if the current powers were transmitted continuously, without change, over an appropriate test time under the exposure standard. $SAR_L$ is the regulatory SAR limit for the given test condition in question (e.g. 1.6 W/kg in 1 g average for FCC head SAR), or a lesser target value.

Let $P_{i,1}$ and $P_{i,2}$ be the average powers being transmitted in the current instant of time by transmitters 1 and 2, respectively, and let $P_{t,1}$ and $P_{t,2}$ be the target powers for transmitters 1 and 2 respectively. The target powers are the powers at which a single transmitter, when operating in standalone operation, would just meet the SAR limit or target, $SAR_L$. Then, by definition and since SAR is related to transmit power in a linear fashion, these quantities are related as follows:

$$\frac{P_{i,1}}{P_{t,1}} = \frac{SAR_1}{SAR_L}$$

$$\frac{P_{i,2}}{P_{t,2}} = \frac{SAR_2}{SAR_L}$$

Substituting these into the TER inequality, we have $$\frac{P_{i,1}}{P_{t,1}} + \frac{P_{i,2}}{P_{t,2}} \leq 1$$

Thus, SAR remains compliant to the limit or target value if the above inequality is met at all instants in time, regardless of the particular values of $P_{i,1}$ and $P_{i,2}$ at any instant in time.

2. Maintaining the TER Inequality Via Dynamic Power Sharing

In general, if the two transmitters are operating in a manner whereby their individual powers vary, but their sum of powers is maintained equal to or less than a fixed value $P_K$, they are said to be operating in a Dynamic Power Sharing mode.

In particular, let's define a specific form of power sharing where the total power target is defined as follows:

$$P_K = \beta P_{t,1} = \alpha P_{t,2}$$

where $\beta$ and $\alpha$ are constant factors for a given combination of transmitters and SAR use case.

Additionally, we set the operation of dynamic power sharing to enforce the following inequality at every instant in time:

$$\beta P_{i,1} + \alpha P_{i,2} \leq P_K$$

We can then rewrite the TER inequality from the previous section as follows:

$$\frac{P_{i,1}}{P_{t,1}} + \frac{P_{i,2}}{P_{t,2}} = \frac{\beta P_{i,1}}{\beta P_{t,1}} + \frac{\alpha P_{i,2}}{\alpha P_{t,2}} = \frac{\beta P_{i,1}}{P_K} + \frac{\alpha P_{i,2}}{P_K} \leq \frac{P_K}{P_K} = 1 \leq 1$$

Thus, application of dynamic power sharing with these constraints will assure that the SAR limit or target is generally always met.

The $\beta$ and $\alpha$ terms are seen to be power offset factors. They are the factors by which the respective target powers differ from some fixed higher total power. For example, in dB terms, if the target powers were 17 and 18 dBm, respectively, and the total power target $P_K$ were chosen as 23 dBm, then $\beta$ and $\alpha$ would be 6 dB and 5 dB, respectively.

Given this, if the dynamic power sharing algorithm defined in 3GPP were simply allowed to operate at the standard total power limit defined for the band and power class in 3GPP TS 38.101-3, but on representational transmit powers in LTE and NR that are offset from those actually being transmitted by the $\beta$ and $\alpha$ terms, SAR will be met. That is, if 3GPP standard dynamic power sharing acts to keep a sum of representational LTE and NR powers equal to 23 dBm (for power class 3 (PC3)), but a fixed power reduction of $\beta$ or $\alpha$ is applied to each of these representational LTE and NR powers to give the actual power to transmit, then SAR will be met. This will also help better ensure the highest possible transmit powers while still meeting SAR, for all combinations of power.

If the representational powers are written in terms of the actual transmit powers as follows $$P_{R,LTE} = \beta P_{i,1}$$

$$P_{R,NR} = \alpha P_{i,2}$$

then the operation of the 3GPP dynamic power sharing algorithm would be expressed as $$P_{R,LTE} + P_{R,NR} \leq P_K$$

Continuing the above example, where the total power target $P_K$ is set as 23 dBm, and $\beta$ and $\alpha$ are set to be 6 dB and 5 dB, respectively, if the LTE network were asking for, say, 20 dBm, then $P_{R,LTE}$ would be set to 20 dBm, $P_{R,NR}$ would be calculated and set to 20 dBm, and the actual LTE transmit power would be set to 14 dBm while the actual NR transmit power would be set to 15 dBm.

Of course, any other value for the total power target, $P_K$, can be chosen, and the exposure target would still be met; the dynamic power sharing algorithm would just no longer have a component that follows in a straightforward manner the dynamic power sharing algorithm implied in 3GPP (although it may still be compliant with the standard in terms of the resultant powers). One such choice would be to set $P_K$ equal to one of the two transmitters' target powers. Without loss of generality, choose to set $P_K$ equal to $P_{t,1}$, that is, set $\beta=1$:

$$P_K=P_{t,1}=\alpha P_{t,2}$$

And the dynamic power sharing equation becomes $$P_{i,1}+\alpha P_{i,2} \leq P_{t,1}$$

Note the implication that a is then equal to the ratio of the target powers:

$$\alpha = \frac{P_{t,1}}{P_{t,2}}$$

By way of example, consider again that transmitter 1 is LTE and transmitter 2 is NR. then $$P_K=P_{t,LTE}=\alpha P_{t,NR}$$

and the dynamic power sharing equation is $$P_{i,LTE} + \alpha P_{i,NR} \leq P_{t,LTE}$$

and $$\alpha = \frac{P_{t,LTE}}{P_{t,NR}}$$

The dynamic power sharing equation can be rearranged as $$P_{i,NR} \leq \frac{1}{\alpha}P_{t,LTE} - \frac{1}{\alpha}P_{i,LTE} = P_{t,NR} - \frac{P_{t,NR}}{P_{t,LTE}}P_{i,LTE} = P_{t,NR}\left(1 - \frac{P_{i,LTE}}{P_{t,LTE}}\right)$$

Another such choice would be to set $P_K$ equal to the highest one of the two transmitters' target powers. Without loss of generality, assume $P_{t,1} \geq P_{t,2}$, and thus choose to set $P_K$ equal to $P_{t,1}$, that is, set $\beta=1$:

$$P_K=P_{t,1}=\alpha P_{t,2}$$

and the dynamic power sharing equation becomes $$P_{i,1}+\alpha P_{i,2} \leq P_{t,1}$$

Note the implication that $\alpha$ is then equal to the ratio of the target powers:

$$\alpha = \frac{P_{t,1}}{P_{t,2}}$$

then for ENDC we can consider two cases, one where transmitter 1 is LTE and the other where transmitter 1 is NR.

Consider first the case that transmitter 1 is LTE and transmitter 2 is NR. Then $$P_K=P_{t,LTE}=\alpha P_{t,NR}$$

and the dynamic power sharing equation is $$P_{i,LTE} + \alpha P_{i,NR} \leq P_{t,LTE} \text{ and}$$

$$\alpha = \frac{P_{t,LTE}}{P_{t,NR}}$$

For the second case, transmitter 1 is NR and transmitter 2 is LTE. Then $$P_K=P_{t,NR}=\alpha P_{t,LTE}$$

and the dynamic power sharing equation is $$P_{i,NR} + \alpha P_{i,LTE} \leq P_{t,NR} \text{ and } \alpha = \frac{P_{t,NR}}{P_{t,LTE}}$$

If we define a new constant applicable to both cases:

$$\gamma = \frac{P_{t,LTE}}{P_{t,NR}}$$

then the power sharing equations for the two cases are as follows:
first case:

$$P_{i,LTE}+\gamma P_{i,NR} \leq P_{t,LTE}$$

second case:

$$P_{i,NR} + \frac{P_{i,LTE}}{\gamma} \leq P_{t,NR} \text{ or}$$

$$\gamma P_{i,NR} + P_{i,LTE} \leq \gamma P_{t,NR} = \frac{P_{t,LTE}}{P_{t,NR}}P_{t,NR} = P_{t,LTE} \text{ or}$$

$$P_{i,LTE} + \gamma P_{i,NR} \leq P_{t,LTE}$$

Hence, it can be seen that the same dynamic power sharing inequality can be applied in both cases, if $\gamma$ is defined in this way. In fact, there is no difference whether $P_{t,LTE}$ is chosen as the dynamic power sharing target power, or the larger of $P_{t,LTE}$ or $P_{t,NR}$ is chosen.

3. Compliance for Physically Separated Antennas

In the analysis in Section 1, a worst-case assumption that the SAR hotspots of the two transmitters overlap was made. In cases where the two transmitters' antennas are physically separated, this may be unnecessarily conservative, and regulatory requirements allow some form of test exclusion to account for this while keeping the test burden acceptably low.

For the Federal Communication Commission (FCC), pairs of sub-6 transmitters are considered to be independent (not subject to simultaneous transmission testing) if the SAR to peak location separation ratio meets the following so-called SAR to peak location separation ratio (SPLSR) criterion:

$$\frac{(SAR_1 + SAR_2)^{1.5}}{R_i} \leq k$$

where $R_i$ is the separation distance in mm between the peak SAR locations for the antenna pair, and k=0.04 for cases tested to the 1 g average limit (head, on-body accessory) and k=0.10 for cases tested to the 10 g average limit (extremity). This equation can be rearranged as $$SAR_1 + SAR_2 \leq \sqrt[1.5]{kR_i} \text{ or}$$

$$\frac{SAR_1}{\sqrt[1.5]{kR_i}} + \frac{SAR_2}{\sqrt[1.5]{kR_i}} \leq 1$$

This is equivalent to the TER inequality for overlapping hotspots in Section 1, if the quantity in the denominators on the left side is equated to the SAR limit value:

$$SAR_L = \sqrt[1.5]{kR_i}$$

yielding the TER inequality $$\frac{SAR_1}{SAR_L} + \frac{SAR_2}{SAR_L} \leq 1$$

Hence, if the respective target power values for each transmitter are defined as the powers at which each transmitter operating individually would meet this SAR target, then dynamic power sharing operating as described in Section 2 will assure that the SPLSR criterion for this pair of transmitters is met at all times.

Note that, for sufficiently spaced antennas, the SAR limit imposed to meet the SPLSR criterion may be higher than the standalone SAR limit for one or both of the transmit antennas. In this case, each transmitter needs to be additionally (independently) limited to its respective SAR limit, while the operation of both transmitters is controlled under dynamic power sharing to meet the SPLSR limit as described here.

In a relatively simpler case, which could still be regarded as following the 3GPP standard, dynamic power sharing would operate with offsets (from the nominal 3GPP power, as in section 2) appropriate to meeting SPLSR applied, and independent caps appropriate to each standalone SAR limit applied to each transmitter. This approach could sometimes result in unnecessary power reduction of NR in cases where LTE power is capped at its standalone SAR limit power. In a more ideal case, requested LTE power would be filled, up to the limit of its standalone SAR limit power, and then allowed NR power calculated to meet the SPLSR criterion according to the dynamic power sharing equation (additionally capped if necessary by the NR transmitter's standalone SAR limit power).

For non-FCC regions, simultaneous transmitters are handled based on some form of actual measured SAR across an expanded area including both hotspots. This permits actual peak SAR for simultaneous transmission to be determined, based on measurement and/or interpolation and extrapolation. Since the combined hotspot with simultaneous transmission at various power levels may no longer coincide with either of the transmitter's standalone hotspots, a closed-form expression for compliance via dynamic power sharing does not appear to be possible. It can be shown that an independent cap on each individual transmit power assures compliance, regardless of the detailed operation of dynamic power sharing. Specifically, if a pair of maximum power caps is determined, under which the simultaneous transmitters meet the relevant SAR limit at every point in space, than any combination of lesser or equal powers will also meet the limit. For transmitters with widely-separated hotspots, these independent maximum power caps will be close to equaling the standalone target powers of the respective transmitters, yielding unencumbered RF performance. In cases where the hotspots are close together, such that a significant reduction in the power cap on each may be required, then it makes sense to assume the worst case of coincident hotspots and apply the dynamic power sharing algorithm as elaborated in Section 2 to help better assure compliance while allowing for closer to maximal transmit power.

4. Summary: Two Specific Implementations

It is seen that the same framework can be applied for both the overlapping-hotspot and the separated hotspot cases, Section 2 and Section 3, respectively. In this section, two alternative implementations of such a framework are elaborated. The first of these can be considered an extension of the 3GPP dynamic power sharing definition, and the second requires a new dynamic power sharing algorithm but offers more optimal performance in some cases. As noted below, both frameworks may apply equally to both the overlapping-hotspot and the separated hotspot cases.

For the example implementations for 5G ENDC operation, the following parameters are used:

$P_{total,3GPP}$=maximum total power (sum of NR & LTE), according to 3GPP standard, for current ENDC combination $P_{LTE,3GPP}$=maximum LTE power, according to 3GPP standard, for current LTE carrier $P_{NR,3GPP}$=maximum NR power, according to 3GPP standard, for current NR carrier $P_{LTE,req}$=requested LTE power from the LTE network $P_{NR,req}$=requested NR power from the NR network $P_{t,LTE}$=Target power at which the LTE carrier would meet a specified SAR target for combined operation when transmitting alone $P_{t,NR}$=Target power at which the NR carrier would meet a specified SAR target for combined operation when transmitting alone $P_{t,SA,LTE}$=Target power at which the LTE carrier would meet a specified SAR target for standalone operation when transmitting alone $P_{t,SA,NR}$=Target power at which the NR carrier would meet a specified SAR target for standalone operation when transmitting alone $P_{i,LTE}$=Actual LTE average transmit power at the current time instant $P_{i,NR}$=Actual NR average transmit power at the current time instant There may be a subtle distinction between the $P_{t,xxx}$ and $P_{t,SA,xxx}$ target powers. The former are the powers where the respective transmitter, when operating alone, would meet a limit that is applicable to the simultaneous transmission use case. The latter are the powers where the respective transmitter, when operating alone, would meet a limit that is applicable to the standalone transmission use case. In the case of non-overlapping hotspots for FCC operation, relying on SPLSR, the $P_{t,xxx}$ targets may be larger than the $P_{t,SA,xxx}$ targets. In the case of non-overlapping hotspots for non-FCC operation, the $P_{t,xxx}$ targets may be smaller than the $P_{t,SA,xxx}$ targets. In the case of overlapping hotspots, they are generally the same.

4.1 Implementation One: Extension of 3GPP DPS

In this method, the modem calculates representational powers for NR and LTE according to the standard, that is, based on power class standard power for each transmitter combination and the LTE and NR powers requested by the network. These representational powers are then converted to the actual transmit powers by 1. Offsetting according to the offset values β and α, defined in Section 2 or Section 3 depending on whether overlap or SPLSR is applicable.
2. Further limiting these offset power values to the lesser of a) their respective power class powers or b) their respective standalone SAR target powers or c) an independent cap in the case of non-FCC (IEC) separated hotspots.

It is seen that for each simultaneous operation combination, each band may require setting one offset value and one limit/cap value. For the non-FCC (IEC) separated-hotspot case, the β and α terms are set to 1 (i.e. 0 dB), so that operation is controlled entirely by the independent limit/cap values for each band.

In this implementation, 3GPP dynamic power sharing is employed to control the combination of representational powers for LTE and NR, as described in Section 2, and the actual transmit powers are then calculated from the representational powers via offsets β and α, further limited by the independent limit values for each band.

In all cases, the total power target for operation of dynamic power sharing is $$P_K = P_{total,3GPP}$$

The representational powers relate to the actual powers to be transmitted as $$P_{R,LTE} = \beta P_{i,LTE}$$

$$P_{R,NR} = \alpha P_{i,NR}$$

And the dynamic power sharing inequality is enforced on the representational powers as follows, with priority given to LTE as per the standard:

$$P_{R,LTE} + P_{R,NR} \leq P_{total,3GPP}$$

or $$\beta P_{i,LTE} + \alpha P_{i,NR} \leq P_{total,3GPP}$$

The independent limit values (power caps) for each band in the ENDC combination are set as follows:

$$P_{cap,LTE} = \text{Min}\{P_{LTE,3GPP}, P_{t,LTE}, P_{t,SA,LTE}\}$$

$$P_{cap,NR} = \text{Min}\{P_{NR,3GPP}, P_{t,NR}, P_{t,SA,NR}\}$$

Thus, if the network is requesting $P_{LTE,req}$ and $P_{NR,req}$, the algorithm will set the actual LTE and NR transmit powers at the current instant in time according to the following equations:

$$P_{R,LTE} = \text{Min}\{P_{LTE,req}, P_{total,3GPP}\}$$

$$P_{R,NR} = \text{Min}\{P_{NR,req}, (P_{total,3GPP} - P_{R,LTE})\}$$

$$P_{i,LTE} = \text{Min}\left\{\frac{P_{R,LTE}}{\beta}, P_{R,LTE}, P_{cap,LTE}\right\}$$

$$P_{i,NR} = \text{Min}\left\{\frac{P_{R,NR}}{\alpha}, P_{R,NR}, P_{cap,NR}\right\}$$

Note that the first two equations denote a 3GPP-standard dynamic power sharing algorithm generating the representational powers $P_{R,LTE}$ and $P_{R,NR}$, and the second two equations denote further manipulation (offset and cap) of those representational powers to assure SAR compliance and 3GPP conformance of the actual transmit powers $P_{i,LTE}$ and $P_{i,NR}$. As an alternative, the second two equations can be alternatively written as follows, if β and α are further constrained to be greater than or equal to one (i.e. greater than or equal to 0 dB):

$$P_{i,LTE} = \text{Min}\left\{\frac{P_{R,LTE}}{\beta}, P_{cap,LTE}\right\}$$

$$P_{i,NR} = \text{Min}\left\{\frac{P_{R,NR}}{\alpha}, P_{cap,NR}\right\}$$

4.1.1 Parameters for All Overlapping-Hotspot Cases and for FCC Non-Overlapping Hotspot Case In all cases where hotspots overlap or are conservatively assumed to overlap, and for FCC cases of non-overlapping hotspots relying on SPLSR, offsets β and α are set based on the appropriate SAR target powers for the case:

$$\beta = \frac{P_{total,3GPP}}{P_{t,LTE}}$$

$$\alpha = \frac{P_{total,3GPP}}{P_{t,NR}}$$

The independent limit values (power caps) for each band in the ENDC combination may be set as follows:

$$P_{cap,LTE} = \text{Min}\{P_{LTE,3GPP}, P_{t,LTE}, P_{t,SA,LTE}\}$$

$$P_{cap,NR} = \text{Min}\{P_{NR,3GPP}, P_{t,NR}, P_{t,SA,NR}\}$$

Note that inclusion of $P_{t,xxx}$ in the $P_{cap,xxx}$ is actually redundant for this case, since the β and α in the dynamic power sharing equation generally ensures that the $P_{t,xxx}$ will be met.

4.1.2 Parameters for Non-FCC Non-Overlapping Hotspot Case

In the non-FCC case of non-overlapping hotspots, offsets β and α are set to a value of 1:

β=1

α=1

The independent limit values (power caps) for each band in the ENDC combination are set as follows:

$$P_{cap,LTE} = \text{Min}\{P_{LTE,3GPP}, P_{t,LTE}, P_{t,SA,LTE}\}$$

$$P_{cap,NR} = \text{Min}\{P_{NR,3GPP}, P_{t,NR}, P_{t,SA,NR}\}$$

Note that $P_{t,xxx}$ is by definition always less than or equal to $P_{t,SA,xxx}$ for this case, so inclusion of $P_{t,SA,xxx}$ in the $P_{cap,xxx}$ may be considered redundant.

4.2 Implementation Two: Non-3GPP DPS

In this instance, the 3GPP dynamic power sharing algorithm is not explicitly followed, although the power results will be 3GPP compliant. Requested LTE power is filled up to its own power class or standalone or non-FCC/non-overlap SAR limit, then NR power is calculated according to the dynamic power sharing expressions but using this fixed LTE power. The same dynamic power sharing inequality is applied, but without the use of the intermediate representational powers, and with the total power target set equal to the LTE SAR target power. (This forces β=1.)

$$P_{i,LTE} + \alpha P_{i,NR} \leq P_{t,LTE}$$

$$\alpha = \frac{P_{t,LTE}}{P_{t,NR}}$$

Thus, the algorithm consists of
1. Set LTE power equal to the lesser of 1) the network-requested LTE power, b) the standalone LTE SAR target power, or c) an independent power cap for the case of non-FCC (IEC), non-overlapping hotspot operation.
2. Calculate allowed NR power according to the dynamic power sharing equation appropriate to the combination, using the appropriate α term.
3. Further limit the NR power to the lesser of a) the network-requested NR power, b) the standalone NR SAR target power, or c) an independent power cap for non-FCC (IEC) non-overlapping hotspot operation.

Thus, if the network is requesting $P_{LTE,req}$ and $P_{NR,req}$, the algorithm will set the actual LTE and NR transmit powers at the current instant in time according to the following equations:

$$P_{i,LTE} = \text{Min}\{P_{LTE,req}, P_{total,3GPP}, P_{cap,LTE}\}$$

$$P_{i,NR} = \text{Min}\left\{\frac{P_{t,LTE} - P_{i,LTE}}{\alpha}, P_{cap,NR}\right\}$$

The above equations can result in $P_{i,NR}$ exceeding the requested NR power, and/or total power exceeding $P_{total,3GPP}$, i.e. device operation out of compliance with the 3GPP standard. This can be corrected by modifying the NR equation as follows. Note that this will result in unnecessary power reductions (from SAR perspective) in some cases.

$$P_{i,NR} = \text{Min}\left\{\frac{P_{t,LTE} - P_{i,LTE}}{\alpha}, (P_{total,3GPP} - P_{i,LTE}), P_{NR,req}, P_{cap,NR}\right\}$$

4.2.1 Parameters for All Overlapping-Hotspot Cases and for FCC Non-Overlapping Hotspot Case In all cases where hotspots overlap or are conservatively assumed to overlap, and for FCC cases of non-overlapping hotspots relying on SPLSR, offset α is set based on the appropriate SAR target powers for the case:

$$\alpha = \frac{P_{t,LTE}}{P_{t,NR}}$$

The independent limit values (power caps) for each band in the ENDC combination are set as follows:

$P_{cap,LTE} = \text{Min}\{P_{LTE,3GPP}, P_{t,LTE}, P_{t,SA,LTE}\}$ $P_{cap,NR} = \text{Min}\{P_{NR,3GPP}, P_{t,NR}, P_{t,SA,NR}\}$ Note that inclusion of $P_{t,xxx}$ in the $P_{cap,xxx}$ is actually redundant for this case, since the α in the dynamic power sharing equation ensures that the $P_{t,xxx}$ will be met.

4.2.2 Parameters for Non-FCC Non-Overlapping Hotspot Case

In the non-FCC case of non-overlapping hotspots, offset α needs to be set to an arbitrarily small positive value, to disable the SAR power-sharing term in the NR equation:

α=0+

The independent limit values (power caps) for each band in the ENDC combination are set as follows:

$P_{cap,LTE} = \text{Min}\{P_{LTE,3GPP}, P_{t,LTE}, P_{t,SA,LTE}\}$ $P_{cap,NR} = \text{Min}\{P_{NR,3GPP}, P_{t,NR}, P_{t,SA,NR}\}$ Note that $P_{t,xxx}$ is by definition always less than or equal to $P_{t,SA,xxx}$ for this case, so inclusion of $P_{t,SA,xxx}$ in the $P_{cap,xxx}$ may be considered redundant.

Examples for Implementation 1

Consider a simple example, for an ENDC combination where the TX antennas are not significantly separated and overlapping hotspots are thus assumed. For the example ENDC combination, assume that $P_{total,3GPP} = P_{LTE,3GPP} = P_{NR,3GPP} = 23$ dBm For the given use case, assume the target powers are $P_{t,LTE} = 17$ dBm $P_{t,NR} = 18$ dBm Because overlapping hotspots are assumed, standalone target powers for each carrier are the same in this example:

$P_{t,SA,LTE} = 17$ dBm $P_{t,SA,NR} = 18$ dBm

For this set of assumed performances, the control parameters will then be set as β=23−17=6 dB (i.e., 4.0 in linear ratio terms)

α=23−18=5 dB (i.e., 3.2 in linear ratio terms)

$P_{cap,LTE} = \text{Min}\{23,17,17\} = 17$ dBm $P_{cap,NR} = \text{Min}\{23,18,18\} = 18$ dBm Now if, for example, the network is requesting $P_{LTE,req}=20$ dBm and $P_{NR,req}=23$ dBm, the dynamic power sharing inequality, filling the LTE request as first priority, will result in representational powers of $P_{R,LTE}=20$ dBm and $P_{R,NR}=20$ dBm. Adjusting these by offsets β and α would result in actual LTE and NR transmit powers of 14 and 15 dBm, respectively; since neither of these exceeds its respective power caps, the final, actual transmit powers would be 14 dBm for LTE and 15 dBm for NR.

If the network is requesting $P_{LTE,req}=23$ dBm and $P_{NR,req}=23$ dBm, the dynamic power sharing inequality, filling the LTE request as first priority, will result in representational powers of $P_{R,LTE}=23$ dBm and $P_{R,NR}=-$infinity dBm (that is, no power for NR). Adjusting these by offsets β and α would result in actual LTE transmit power 17 dBm, and NR power of −infinity dBm; since neither of these exceeds its respective power caps, the final, actual transmit powers would be 17 dBm for LTE and NR TX would be off.

Figure 3:
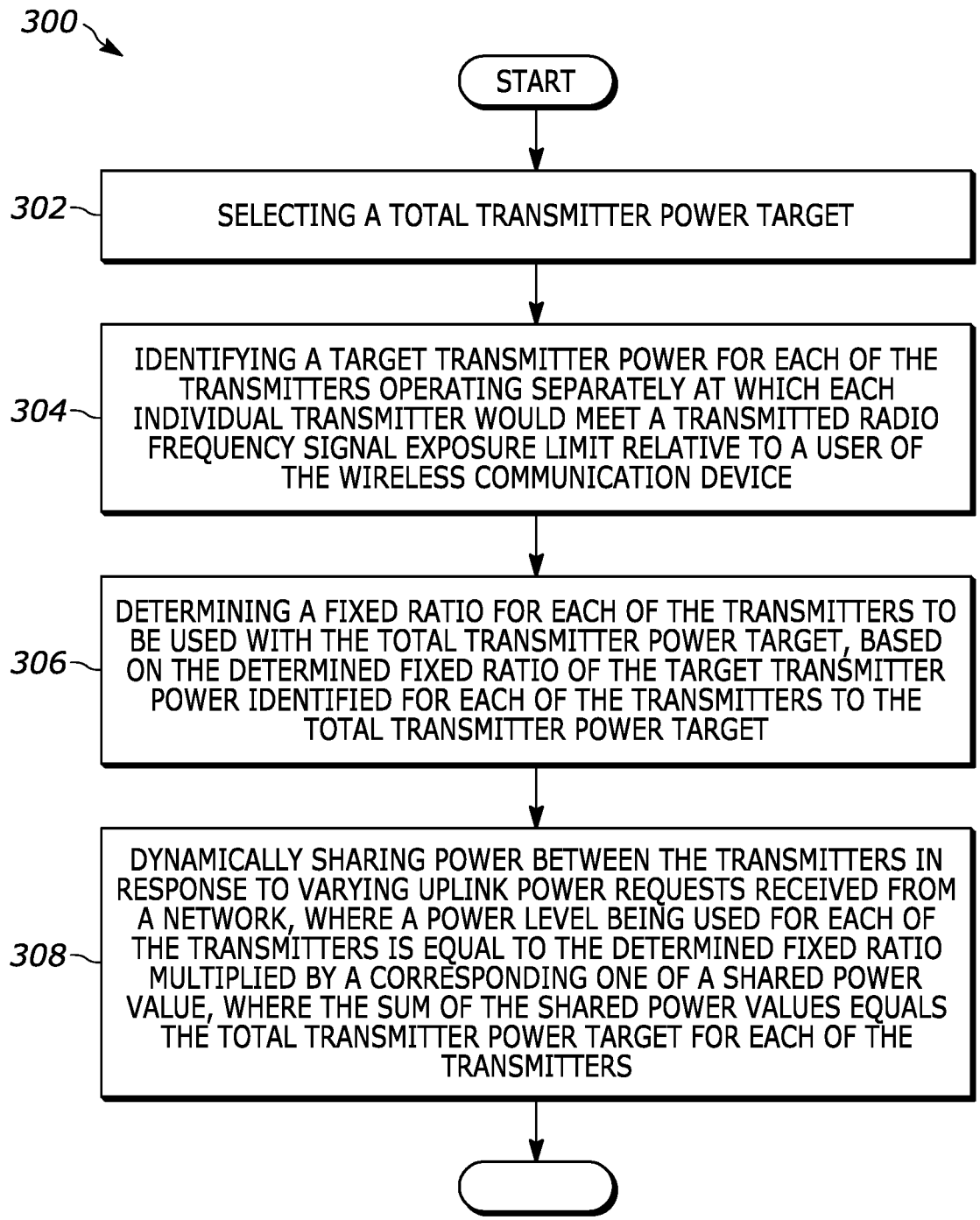
FIG. 3 is a flow diagram of a method for sharing a total power budget between at least two transmitters included as part of the wireless communication device.

FIG. 3 illustrates a flow diagram 300 of a method for sharing a total power budget between at least two transmitters included as part of the wireless communication device. The management of radio frequency power and correspondingly the sharing of a total power budget, as outlined in the illustrated flow diagram could be implemented in support of the wireless communication capabilities of the device. In at least the illustrated embodiment, the method includes selecting 302 a total transmitter power target. A target transmitter power is identified 304 for each of the transmitters operating separately at which each individual transmitter would meet a transmitted radio frequency signal exposure limit relative to a user of the wireless communication device. A fixed ratio is determined 306 for each of the transmitters to be used with the total transmitter power target, based on the determined fixed ratio of the target transmitter power identified for each of the transmitters to the total transmitter power target.

Power is dynamically shared 308 between the transmitters in response to varying uplink power requests received from a network, where a power level being used for each of the transmitters equal to the determined fixed ratio multiplied by a corresponding one of a shared power value, where the sum of the shared power values equals the total transmitter power target for each of the transmitters.

In some instances, the power level being used for each of the transmitters can be further based on a respective independent fixed cap for each of the transmitters.

In some of these instances, for at least a first geographic region, the power level being used for each of the transmitters may prioritize the determined fixed ratio to the target transmitter power, and where for at least a second geographic region, different from the first geographic region, the power level being used for each of the transmitters may prioritize the respective independent fixed cap for each of the transmitters.

In other of these instances, when the transmitters are co-located, the power level being used for each of the transmitters may prioritize the determined fixed ratio to the target transmitter power. The determination that the transmitters are co-located may be a function of a distance between the peak specific absorption rate locations respectively associated with the transmitters, and a determined value of a combined specific absorption rate for the transmitters.

In still other of these instance, when the transmitters are not co-located, the power level being used for each of the transmitters may prioritize the respective independent fixed cap for each of the transmitters.

In still other of these instances, the respective independent fixed cap for each of the transmitters is the lesser of a maximum transmitter power for a particular transmitter, a combined target power at which the particular transmitter would meet a transmitted radio frequency signal exposure limit relative to a user for combined operation when transmitting alone, and a standalone target power.

In some instances, the power being dynamically shared between the transmitters can include a determination of the power level being used for each of the transmitters based upon a time averaging algorithm that determines the transmitted radio frequency signal exposure limit relative to each of at least one associated window of time.

In some instances, the transmitters of the user equipment support dual connectivity operation. In some of these instances, one of the transmitters may be associated with a master cell group and another one of the transmitters may be associated with a secondary cell group. In some instances, the transmitter associated with the master cell group may be prioritized relative to a transmission via the transmitter associated with the secondary cell group. When the network is requesting a transmission power level for the transmitter associated with the master cell group that is equal to or greater than the total transmitter power target, then the power level for the transmitter associated with the secondary cell group may be set zero. In further instances, the transmitter associated with the master cell group can communicate with a network that is implemented in accordance with a long term evolution (LTE) cellular standard; and the transmitter associated with the secondary cell group can communicate with a network that is implemented in accordance with a new radio (NR) cellular standard.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
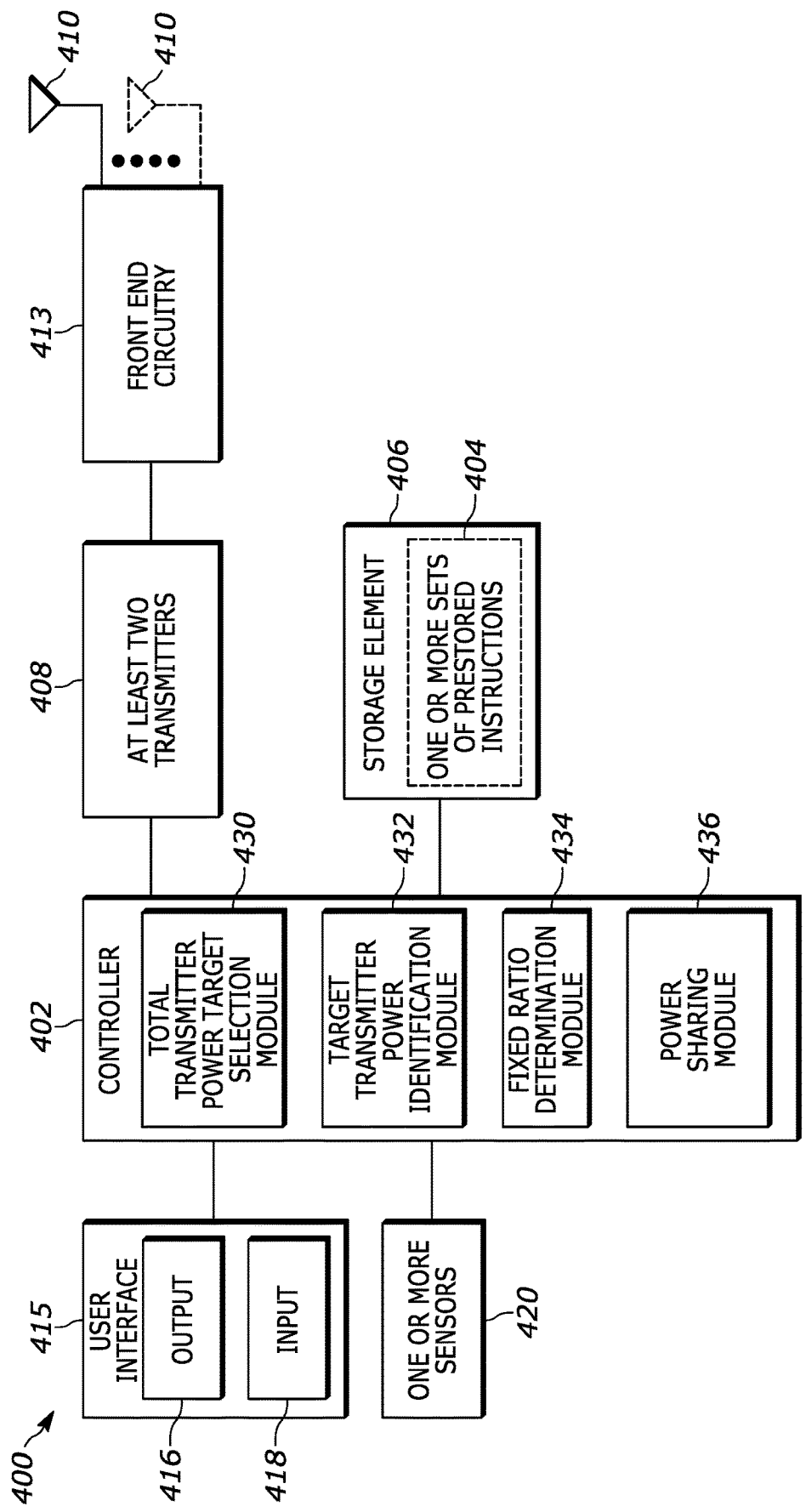
FIG. 4 is a block diagram of an exemplary wireless communication device.

FIG. 4 illustrates a block diagram 400 of an exemplary wireless communication device, in accordance with at least one embodiment. In the illustrated embodiment, the wireless communication device includes a controller 402, which is adapted for managing at least some of the operation of the device. In some embodiments, the controller 402 could be implemented in the form of one or more processors, which can each be adapted to execute one or more sets of pre-stored instructions 404, and which may be used to form or implement the operation of at least part of one or more controller modules including those used to manage wireless communication and/or the management of radio frequency power for energy-based time averaging control.

The one or more sets of pre-stored instructions 404 may be stored in a storage element 406, which while shown as being separate from and coupled to the controller 402, may additionally or alternatively include some data storage capability for storing at least some of the prestored instructions for use with the controller 402, that is integrated as part of the controller 402.

The storage element 406 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 402 may additionally or alternatively incorporate state machines and/or logic circuitry, which can be used to implement at least partially, some of the modules and/or functionality associated with the controller 402 including all or portions of the claimed methods.

In the illustrated embodiment, the controller 402 includes a total transmitter power target selection module 430, that can select a total transmitter power target. The controller 402 further includes a target transmitter power identification module 432 that identifies a target transmitter power for each of the transmitters operating separately at which each individual transmitter would meet a transmitted radio frequency signal exposure limit relative to a user of the wireless communication device. The controller 402 still further includes a fixed ratio determination module 434 that determines a fixed ratio for each of the transmitters to be used with the total transmitter power target, based on the determined fixed ration of the target transmitter power identified for each of the transmitters to the total transmitter power target. Further yet, the controller 402 includes a power sharing module 436 that dynamically shares power between the transmitters in response to varying uplink power requests received from a network, where a power level being used for each of the transmitters may be equal to the determined fixed ratio multiplied by a corresponding one of a shared power value, where the sum of the shared power values equals the total transmitter power target for each of the transmitters. The controller 402, can include even further modules without departing from the teachings of the present application.

In the illustrated embodiment, the device additionally includes at least two transmitters 408, which can take the form of one or more transceivers, which are coupled to the controller 402 and which serve to manage the external communication of data including their wireless communication using one or more forms of communications. In such an instance, the at least two transmitters 408 will each generally be coupled to one or more antennas 410, or radiating elements, via which the wireless communication signals will be radiated and/or received. Multiple transmitters may be coupled to the same radiating element. In the present instance, the at least two transmitters 408 are coupled to the one or more antennas 410 via front end circuitry 413.

The front end circuitry 413 can often include various sub-elements, such as power amplifiers, filters, diplexers, duplexers and switches, which help to facilitate the coupling of a produced signal to an antenna. The front end circuitry 413 can further include impedance matching elements, antenna tuners, and/or additional signal amplifiers, so as to more effectively manage the conveyance of signals between the one or more transmitters 408, and the antenna elements 410.

In the illustrated embodiment, the device can additionally include user interface circuitry 415, some of which can be associated with producing an output 416 to be perceived by the user, and some of which can be associated with detecting an input 418 from the user. For example, the user interface circuitry 415 can include a display 202 adapted for producing a visually perceptible output, which may further support a touch sensitive array for receiving an input from the user. The user interface circuitry may also include a speaker 206 for producing an audio output, and a microphone 208 for receiving an audio input. The user interface output 416 could further include a vibrational element. The user interface input 418 could further include one or more user actuatable switches 204, as well as one or more cameras 210. Still further alternative and additional forms of user interface elements may be possible.

In the illustrated embodiment, the device can still further include one or more sensors 420, which can be used for gathering status information relative to the operating environment as well as the manner in which the device is being used, such as one or more device operating conditions. For example, the one or more sensors 420 can include one or more of tilt sensors and/or proximity sensors, which the device can use to detect the usage orientation, as well as the presence of nearby elements proximate the corresponding sensors, as well as the device in general. The use of still further types of sensors are possible in identifying use conditions or modes of operation without departing from the teachings of the present application.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless communication device for sharing a total power budget between at least two transmitters included as part of the wireless communication device, the method comprising:
    selecting a total transmitter power target;
    identifying a target transmitter power for each of the transmitters operating separately at which each individual transmitter would meet a transmitted radio frequency signal exposure limit relative to a user of the wireless communication device;
    determining a fixed ratio for each of the transmitters to be used with the total transmitter power target, based on the determined fixed ratio of the target transmitter power identified for each of the transmitters to the total transmitter power target; and
    dynamically sharing power between the transmitters in response to varying uplink power requests received from a network, where a power level being used for each of the transmitters is equal to the determined fixed ratio multiplied by a corresponding one of a shared power value, where the sum of the shared power values equals the total transmitter power target for each of the transmitters.

2. The method in accordance with claim 1, wherein the power level being used for each of the transmitters is further based on a respective independent fixed cap for each of the transmitters.

3. The method in accordance with claim 2, wherein for at least a first geographic region, the power level being used for each of the transmitters prioritizes the determined fixed ratio to the target transmitter power; and
    wherein for at least a second geographic region, different from the first geographic region, the power level being used for each of the transmitters prioritizes the respective independent fixed cap for each of the transmitters.

4. The method in accordance with claim 2, wherein when the transmitters are co-located, the power level being used for each of the transmitters prioritizes the determined fixed ratio to the target transmitter power.

5. The method in accordance with claim 4, wherein the determination that the transmitters are co-located is a function of a distance between the peak specific absorption rate locations respectively associated with the transmitters, and a determined value of a combined specific absorption rate for the transmitters.

6. The method in accordance with claim 2, wherein when the transmitters are not co-located, the power level being used for each of the transmitters prioritizes the respective independent fixed cap for each of the transmitters.

7. The method in accordance with claim 2, wherein the respective independent fixed cap for each of the transmitters is the lesser of a maximum transmitter power for a particular transmitter, a combined target power at which the particular transmitter would meet a transmitted radio frequency signal exposure limit relative to a user for combined operation when transmitting alone, and a standalone target power.

8. The method in accordance with claim 1, wherein the power being dynamically shared between the transmitters includes a determination of the power level being used for each of the transmitters based upon a time averaging algorithm that determines the transmitted radio frequency signal exposure limit relative to each of at least one associated window of time.

9. The method in accordance with claim 1, wherein the transmitters of the user equipment support dual connectivity operation.

10. The method in accordance with claim 9, wherein one of the transmitters is associated with a master cell group and another one of the transmitters is associated with a secondary cell group.

11. The method in accordance with claim 10, wherein a transmission via the transmitter associated with the master cell group is prioritized relative to a transmission via the transmitter associated with the secondary cell group.

12. The method in accordance with claim 11, wherein when the network is requesting a transmission power level for the transmitter associated with the master cell group that is equal to or greater than the total transmitter power target, then the power level for the transmitter associated with the secondary cell group is set zero.

13. The method in accordance with claim 10, wherein the transmitter associated with the master cell group communicates with a network that is implemented in accordance with a long term evolution (LTE) cellular standard; and wherein the transmitter associated with the secondary cell group communicates with a network that is implemented in accordance with a new radio (NR) cellular standard.

14. A wireless communication device comprising:
- at least two transmitters, each associated with a radiating element;
- a controller coupled to the transmitter, the controller including
  - a total transmitter power target selection module;
  - a target transmitter power identification module for identifying a target transmitter power for each of the transmitters operating separately at which each individual transmitter would meet a transmitted radio frequency signal exposure limit relative to a user of the wireless communication device;
  - a fixed ratio determination module that determines a fixed ratio for each of the transmitters to be used with the total transmitter power target, based on the determined fixed ratio of the target transmitter power identified for each of the transmitters to the total transmitter power target; and
  - a power sharing module that dynamically shares power between the transmitters in response to varying uplink power requests received from a network, where a power level being used for each of the transmitters is equal to the determined fixed ratio multiplied by a corresponding one of a shared power value, where the sum of the shared power values equals the total transmitter power target for each of the transmitters.

15. The wireless communication device in accordance with claim 14, wherein the power level being used for each of the transmitters is further based on a respective independent fixed cap for each of the transmitters.

16. The wireless communication device in accordance with claim 15, wherein for at least a first geographic region, the power level being used for each of the transmitters prioritizes the determined fixed ratio to the target transmitter power; and
wherein for at least a second geographic region, different from the first geographic region, the power level being used for each of the transmitters prioritizes the respective independent fixed cap for each of the transmitters.

17. The wireless communication device in accordance with claim 15, wherein when the transmitters are co-located, the power level being used for each of the transmitters prioritizes the determined fixed ratio to the target transmitter power.

18. The wireless communication device in accordance with claim 17, wherein the determination that the transmitters are co-located is a function of a distance between the peak specific absorption rate locations respectively associated with the transmitters, and a determined value of a combined specific absorption rate for the transmitters.

19. The wireless communication device in accordance with claim 15, wherein when the transmitters are not co-located, the power level being used for each of the transmitters prioritizes the respective independent fixed cap for each of the transmitters.

20. The wireless communication device in accordance with claim 14, wherein the power being dynamically shared between the transmitters includes a determination of the power level being used for each of the transmitters based upon a time averaging algorithm that determines the transmitted radio frequency signal exposure limit relative to each of at least one associated window of time.

* * * * *